US005718115A

United States Patent [19]

Burkner

[11] Patent Number: 5,718,115

[45] Date of Patent: Feb. 17, 1998

[54] CONSTANT FORCE HYDRAULIC CONTROL SYSTEM

[75] Inventor: Paul F. Burkner, Stockton, Calif.

[73] Assignee: AIM, Inc., Lodi, Calif.

[21] Appl. No.: 657,666

[22] Filed: May 31, 1996

[51] Int. Cl.[6] .............................. F16D 31/02; F15B 15/17

[52] U.S. Cl. .............................. 60/413; 60/469; 91/416; 91/436; 91/437

[58] Field of Search .............................. 91/415, 416, 437, 91/508, 435, 417 R; 60/413, 469, 420

[56] References Cited

U.S. PATENT DOCUMENTS

| | | | |
|---|---|---|---|
| 3,436,913 | 4/1969 | Muller et al. | 60/416 X |
| 3,476,016 | 11/1969 | Dixon et al. | 91/415 X |
| 3,584,537 | 6/1971 | Schulz | 91/535 X |
| 3,747,472 | 7/1973 | Knutson | 91/523 X |
| 3,863,547 | 2/1975 | Meier et al. . | |
| 3,872,670 | 3/1975 | Dezelan et al. | 60/469 X |
| 3,969,985 | 7/1976 | Grieger et al. | 91/416 |
| 4,919,039 | 4/1990 | Nutter | 91/417 R X |
| 4,969,562 | 11/1990 | Saotome | 60/469 X |
| 5,044,446 | 9/1991 | Jonasson et al. . | |
| 5,074,108 | 12/1991 | Claxton et al. . | |
| 5,140,895 | 8/1992 | Imanishi | 91/417 R X |
| 5,417,064 | 5/1995 | Galuszka | 60/416 |
| 5,447,094 | 9/1995 | Geyler, Jr. | 91/535 X |

*Primary Examiner*—Hoang Nguyen
*Attorney, Agent, or Firm*—Majestic, Parsons, Siebert & Hsue

[57] ABSTRACT

The use of an accumulator attached to a chamber of a cylinder allows for the reduction in pressure spikes in constant force hydraulic control systems. Constant force hydraulic control systems often use a differential pressure valve that may have a reaction time of up to one second. By using the accumulator, pressure spikes which might have occurred in the past can be smoothed out and reduced, thus preventing damage to a workpiece or agricultural product. Additionally, by using two cylinders of different sizes, in which one of the cylinders has a barrel end with the approximately the same area as the rod end of the larger cylinder, coordination of devices attached to the cylinders can be maintained without a mechanical link when the hydraulic control system is in a manual mode.

19 Claims, 2 Drawing Sheets

CONSTANT FORCE HYDRAULIC CONTROL SYSTEM

BACKGROUND OF THE INVENTION

This invention relates to a system and apparatus used for providing a constant force. Many systems require the application of a variable constant force for use with conveyor belts, tong-type grippers, and other clamping-type devices that have industrial and agricultural harvesting applications. In these systems, it is important to grip a workpiece on an assembly line or an agricultural product with a known and variable force. This force should be independent of the surface of the workpiece or agricultural products. That is, a constant force is supplied whatever position the grippers are in as a result of the shape of the object being gripped.

SUMMARY OF THE INVENTION

A cylinder or cylinders can be connected hydraulically to a differential pressure valve in order to maintain a constant force through a piston out to the gripper that contacts the work product or agricultural products. The cylinder forms two enclosed chambers on either side of the piston. Hydraulic pressure is supplied to both sides of the piston and a force determined by the difference in the hydraulic pressure between the two chambers of the cylinder is supplied through the piston to the gripper. The differential pressure valve is hydraulically connected to ports at both chambers of the cylinder. The differential pressure valve is adapted to switch between connecting and disconnecting the two chambers. The two chambers are hydraulically connected when the differential pressure is greater than a certain amount. This causes the differential pressure to drop. The differential pressure valve causes the two chambers to be hydraulically disconnected when the differential pressure is less than a certain amount. Disconnecting the two chambers causes the differential pressure to rise. The differential pressure is preferably controlled by an adjustable spring on the differential pressure valve. By adjusting the spring in the differential pressure valve, the force supplied by the piston can be controlled.

A problem recognized by the present inventors is that the switching of a differential pressure valve typically involves a short delay of up to a second. This means that, if a grabber attached to a cylinder is stopped by the agricultural products or a workpiece, a pressure spike can build up before the differential pressure valve switches. This pressure spike is translated into force at the grabber that could damage the workpiece or agricultural products.

The inventor has discovered that, by hydraulically attaching an accumulator to at least one side of the cylinder, these pressure spikes can be reduced. An accumulator is a two-part chamber divided by a bladder with a hydraulic section and a pressurized gas section. As the pressure spike begins, the pressure causes the gas section of the accumulator to be compressed, while the hydraulic portion of the accumulator is allowed to expand. This reduces the pressure in the hydraulic line. For this reason, the differential pressure will rise more slowly and the differential pressure valve will have more time to react to the rise in differential pressure. The accumulator can react much quicker to the rise in pressure than can the differential pressure valve.

In a preferred embodiment, the constant force or "soft touch" mode can be switched to a manual control mode in which the operator controls the positioning of the devices attached to the cylinders. Each of the cylinders can be controlled individually, or in a preferred embodiment, the motion of the devices attached to the cylinders can be coordinated. The coordinated movement of the cylinders can be done without use of a mechanical link by using cylinders of different sizes. Preferably, the barrel end of one cylinder has approximately the same area as the rod end of the other cylinder. The rod end of the cylinder effectively has a torus shape since the rod is attached to the center. By keeping these areas roughly equal in this manner, and by connecting the ports at the barrel end of one cylinder and the rod end of the other cylinder, an equal pressure is supplied in both chambers which is converted to an equivalent change in position through the piston. The movement of the devices attached to the cylinders is coordinated. This coordinated motion occurs without a mechanical link.

BRIEF DESCRIPTION OF THE DRAWINGS

The above and other features and aspects of the present invention will become more apparent upon reading the following detailed description in conjunction with the accompanying drawings, in which.

DETAILED DESCRIPTION OF THE PREFERRED EMBODIMENTS

Figure 1:
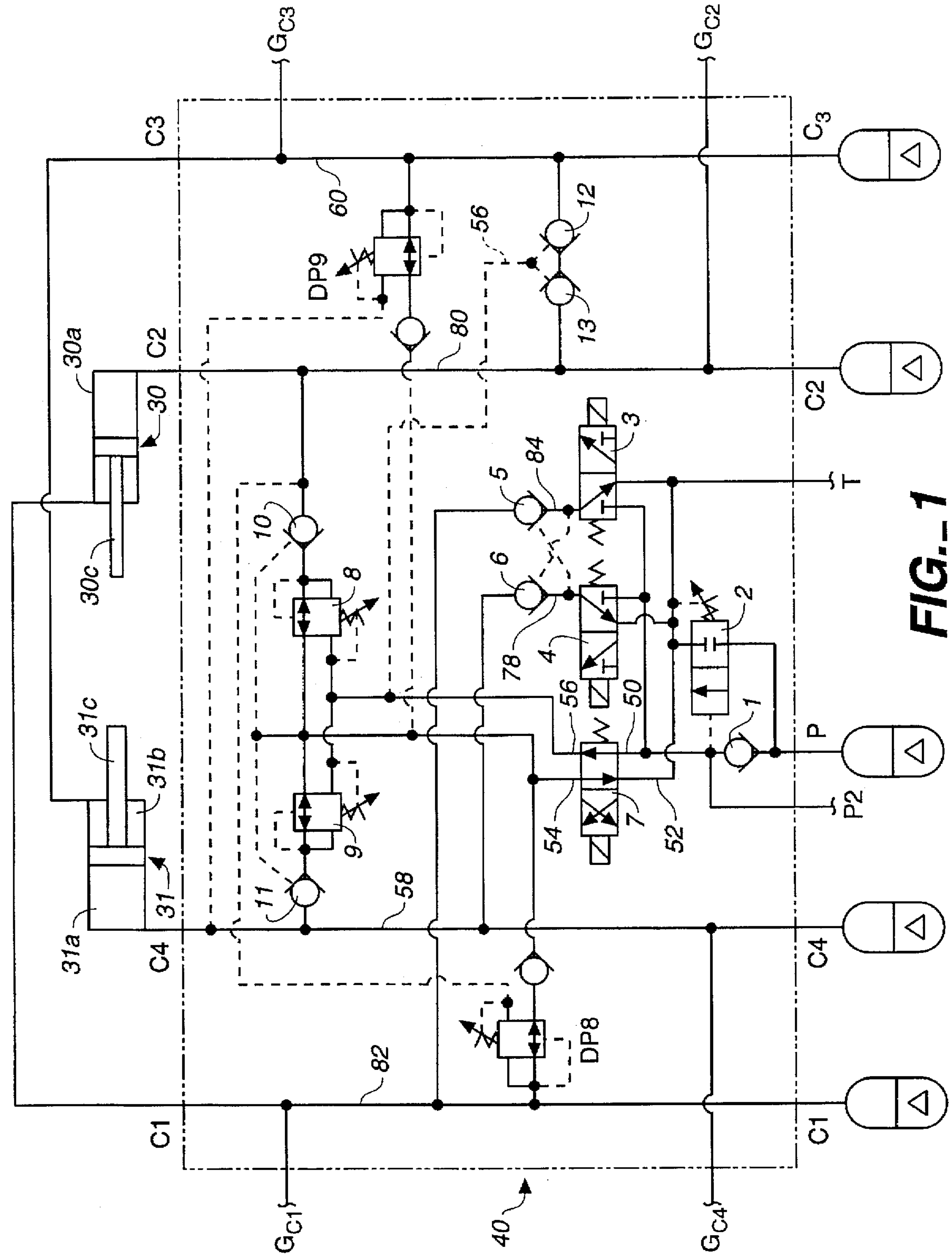
FIG. 1 is a diagram of the hydraulic control system of the present invention.

FIG. 1 shows a hydraulic control circuit of the present invention. The basic hydraulic circuit 40 is universal so that it can be used with both open or closed center type hydraulic systems. For open center applications, hydraulic flow is routed from pressure port P to the unloading valve 2, which remains closed until a preset system pressure is reached. When this occurs, the valve 2 opens and allows hydraulic oil to continue to flow on downstream of the circuit. While the unloading valve 2 is closed, the accumulator (not shown) at port P2 is charged, which in turn provides pressurized hydraulic flow to the balance of the circuit. This is a dynamic process which involves the charging and unloading of the accumulator as oil is consumed in the circuit.

For closed center applications, the hydraulic fluid under pressure is applied directly to port P, while the unloading valve 2 is removed and replaced with a plug. This provides pressurized flow to the balance of the circuit.

"Soft Touch Mode"

Figure 2:
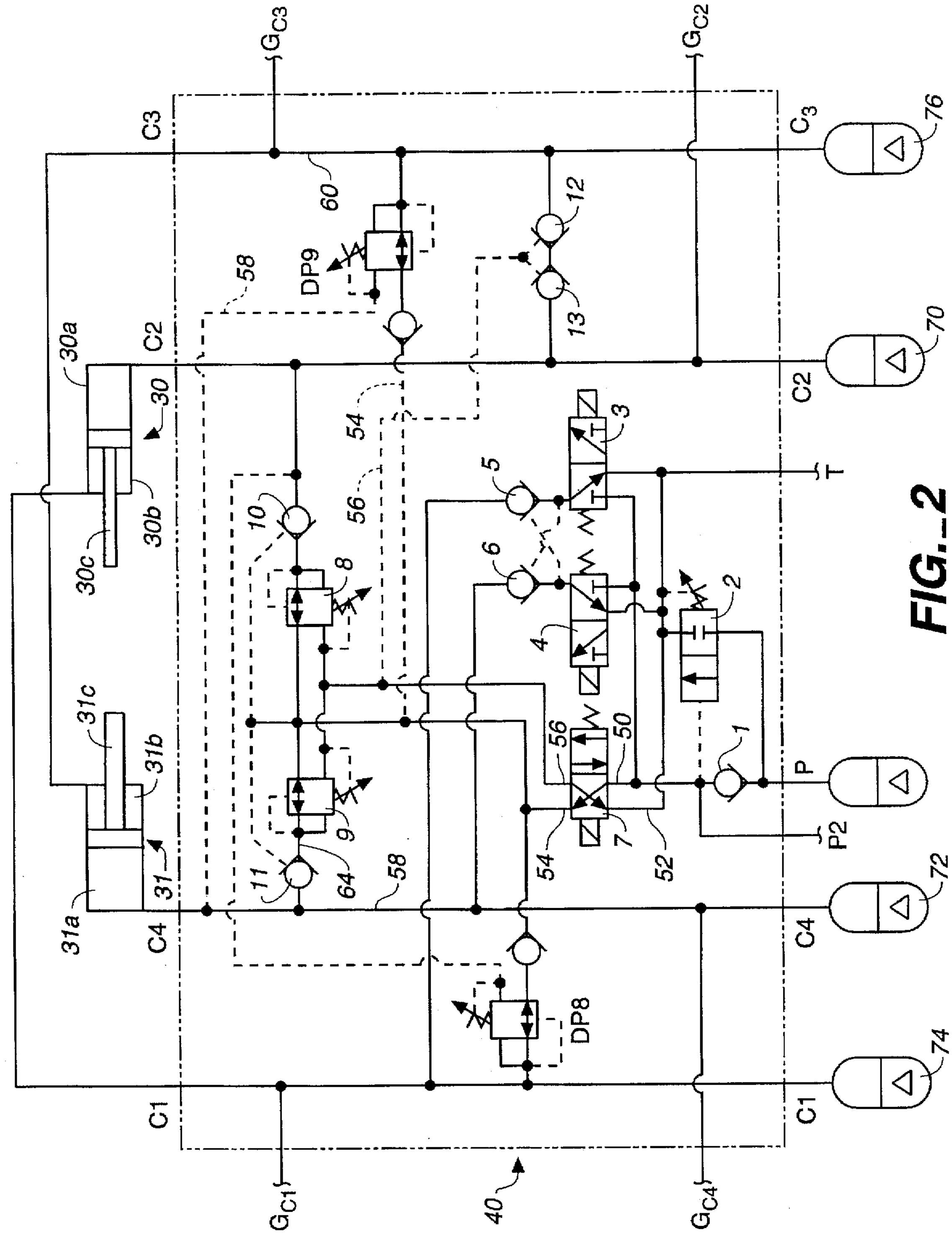
FIG. 2 is a diagram of the hydraulic control system of the present invention illustrating the "soft touch" mode.

As shown in FIG. 2, the activation of a solenoid valve 7 connects line 50 to line 54. This allows oil to flow through the pressure-reducing relieving valve 9 and to the check valve 11, which pressurizes port C4 attached to the barrel chamber of the cylinder 31, as well as providing back pressure to the differential pressure valve DP9.

The differential pressure valve DP9 works as follows. When the pressure from the line 58, which is connected to the barrel end of cylinder 31, combined with the spring force is greater than the pressure from the line 60, which is connected to the rod end of cylinder 31, the differential pressure valve DP9 will be positioned as shown in FIG. 2, connecting line 54 to line 60. This causes the pressure on line 60 to increase, since as described below the pressure on line 54 is set to be greater than the pressure on line 58 by the use of the valve 9. As the pressure on line 60 increases, eventually the pressure at line 60 becomes greater than the pressure on line 58 plus the spring constant. This causes the switch DP9 to switch and connect line 60 with line 58, thus hydraulically connecting the barrel chamber and rod chamber with the cylinder 31. This causes the pressures in the chambers to begin to equalize and thus reduces the differential pressure. In this fashion, differential pressure valve DP9 dynamically switches so as to maintain a differential pressure between the barrel chamber 31*a* and rod chamber 31*b* of cylinder 31. The differential pressure is determined by setting the variable spring on the differential pressure valve DP9.

Since the line 56 is drained through the solenoid valve 7 to line 52 and out to the port T, the valve 9 will dynamically maintain the pressure in line 58 according to the setting of the variable spring in the valve 9. That is, if the pressure at line 64 is greater than the spring pressure of valve 9, oil from line 58 will bleed out line 56. When the pressure at line 64 is less than the spring force of the valve 9, lines 54 and 64 are connected as shown in FIG. 2. Thus, the setting of the spring on valve 9 controls the pressure in chamber 31*a*. As described above, the value set on the spring of valve DP9 controls the differential pressure between chamber 31*a* and 31*b*.

Cylinder 30 is acted on in a similar manner through pressure-reducing/relieving valve 8 and differential pressure valve DP8. Thus, cylinder 30 is also acted upon by two different pressures that allow the cylinder to float back and forth while maintaining a predetermined force on the rod due to the differential pressures exerted on the cylinder from chamber 30*a* and chamber 30*b*. A typical range for the differential pressure between C1 and C2 and between C3 and C4 is about 80–200 psi.

In order to maintain an equivalent force from piston 30*c* as from piston 31*c*, the settings for the springs on DP8 and valve 8 are preferably slightly different from the settings of valve 9 and DP 9, since cylinder 30 is smaller than cylinder 31 in order to have the coordinated motion described below. In a preferred embodiment cylinder 30 has a $2\frac{1}{2}\phi$ bore with $1\frac{1}{8}\phi$ rod ×4" stroke; and cylinder 31 has a $2\frac{3}{4}\phi$ bore with $1\frac{1}{8}\phi$ rod ×4" stroke.

In a preferred embodiment, nitrogen in the accumulators C1–C4 are precharged to 100–300 psi and the nitrogen in accumulator P is precharged to 600–1200 psi. Between 1000–1800 psi of pressure is supplied in port P2. The pressure at gauges $G_{c1}$ and $G_{c3}$ range from 100–600 psi; pressure at gauge $G_{c4}$ ranges from 80–300 psi; pressure at gauge $G_{c2}$ ranges from 80–400 psi.

In a preferred embodiment, Accumulators C1, C2, C3 and C4 are Greer #847110; Accumulator P is a Oilair #FC60-100-3, Sequence unloading valve 2 is a Hydraforce #PS10-32A-0-N-21; four way valve 7 is a Hydraforce #SV10-40-0-N-00 w/6351012 coil; three-way valve 3 and 4 are Hydraforce #SV08-33-0-N-00 w/6351012 coil; pilot operated check valves 10,11,12 and 13 are Hydraforce #PC10-30-0-N; pilot operated check valves 5 and 6 are Hydraforce #PC08-30-0-N; check valve 1 is a Hydraforce #CV10-20; Differential pressure reducing valve 8 and 9 are Hydraforce #PR08-32A; and, Pressure reducing relieving valve 8 and 9 are Hydraforce #PR10-32A-0-N-08.

Note that the pressure in chambers 30*a* produces a force proportional to the area of the barrel end of the piston 30*c*, and the pressure at 30*b* produces a force proportional to the rod end of piston 30*c*. Since the rod end of piston 30*c* is smaller than the barrel end of piston 30*c*, this will affect the pressures required to put into the chambers 30*a* and 30*b* in order to provide the desired constant force on rod 30*c*.

At this point, cylinders 30 and 31 are activated in a parallel manner, since the pilot activated check valves 12 and 13 are closed, cutting off the series link discussed below. Valves 12 and 13 are closed because line 56 is bled out through the line 52 to tank T.

Accumulators 70 and 72 are used to pick up any surges in the circuit due to the rapid fluctuations in the forces exerted on the cylinders 30 and 31. These accumulators are preferably positioned at the rod chamber ends of the cylinders. These rapid fluctuations in pressure may be caused by the grabbers contacting a rigid object. The accumulators 70 and 72 smooth down the pressure surge by compressing a pressurized gas portion of the accumulators. Accumulators 74 and 76 can also be added to aid in the reduction of surges, but are not necessary in the preferred design. Accumulators include pressure tanks precharged with gas, such as nitrogen, separated by a bladder from the hydraulic fluid section. The accumulators smooth down pressure spikes. The differential pressure valve DP9 may take up to a second to respond to a rapid increase in the differential pressure between the pressure in the chambers 31*a* and 31*b*. The reduction in the pressure spike buildup as a result of accumulators 70 and 72 can prevent or reduce damage to the work object or crop contacted by the grabber attached to pistons 30*c* and 31*c*.

One potential problem with prior art systems is that small leaks between the two chambers of each cylinder can cause the piston to slip out of position. This would occur if a fixed pressure is applied to chambers 31*a* and 31*b*. Dynamically switching valves DP9 and DP8 in order to maintain the differential pressure between chambers 31*a* and 31*b*, and chambers 30*a* and 30*b*, allows for the automatic compensation of leaks in the cylinders.

Manual Mode, Static State

Looking again FIG. 1, oil enters in port P charging the circuit until the unloading valve 2 shifts to let the flow continue downstream. At this point, oil under pressure charges line 56. Line 54 is vented at low pressure back to the tank T along line 52. In this mode, pilot check valves 13 and 12 are opened by the pressurized oil on line 56. This results in cylinders 30 and 31 being connected in series. Since in the preferred embodiment, the cylinders are sized so that the area of the barrel end of piston 30*c* is approximately equal to the area of the rod end of piston 31*c*, any subsequent flow in the cylinder circuit will cause each of them to move, or displace an equal amount. Thus, the coordination of two cylinders is accomplished without a mechanical link.

Manual Mode, Extending Cylinders

Activating solenoid valve 4 causes pressurized fluid to flow from line 50 to line 78 opening valves 5 and 6. This puts pressurized oil to port C4, which causes cylinder 31 to extend. The extension of cylinder 31 causes oil to flow out of the rod port C3. Since line 56 is pressurized opening valves 12 and 13, the oil from line 60 will flow to line 80 and port C2, which causes the cylinder 30 to extend. Oil from the rod end of cylinder 30 flows out port C1 along line 82 through valve 5 and out to tank T. Again, this illustrates the coordination of the two cylinders without the use of a mechanical link. As discussed above, coordination is assured since the amount of fluid exiting chamber 31*b* is the same amount of fluid entering chamber 30*a*, and the surface area of the barrel end of piston 30*c* is the same as the surface area of the rod end of piston 31*c*.

Manual Mode, Retracting Cylinders

Activating the solenoid valve 3 allows pressurized fluid from line 50 to go to line 84 opening valves 5 and 6. This causes pressurized fluid to be pushed onto line 82 at port C1, which causes cylinder 30 to retract. The retraction of cylinder 30 causes oil to flow out of the barrel port along line 80. The oil travels through the pilot check valve 12 and 13, which are held open by the pressurized oil on line 56. The oil continues along line 60 to port C3 which causes cylinder 31 to retract. Oil from the barrel end of cylinder 31 flows through line 58 and valve 6 to line 78 and through solenoid 4 out line 52 to tank T. Again, the two cylinders move in coordination without the use of a mechanical link.

The above-described tensioning system can be applied to a single tensioning, clamping, or gripper device, or to a pair or more of such devices which must be opened and closed in a coordinating manner without the use of a mechanical connection to provide the coordination. This system can also be applied to rotary-type tensioning devices. For example, it may be used for driving a roll or spindle that contacts a fragile material.

Various details of the implementation and method are merely illustrative of the invention. It will be understood that various changes of such details may be within the scope of the invention, which is to be limited only by the appended claims.

It is claimed:

1. A device for maintaining a constant force comprising:

a cylinder which is adapted to provide a force, the cylinder having hydraulic ports on both ends of the cylinder;

a differential pressure valve hydraulically connected between the ports on both ends of the cylinder, the differential pressure valve adapted such that when it is enabled, the valve attempts to maintain a constant pressure differential between the two ports;

an accumulator hydraulically connected to one port of the cylinder so that when the differential pressure valve is enabled the accumulator reduces pressure spikes which would occur before the differential pressure valve would be able to react to the pressure differential between the two ports;

a second cylinder adapted to provide a force, the cylinder having hydraulic ports on both ends of the second cylinder; a second differential pressure valve hydraulically connected between the ports on both ends of the second cylinder, the differential pressure valve adapted such that when it is enabled, the valve attempts to maintain a constant pressure differential between the two ports on the second cylinder; and a second accumulator hydraulically connected to one side of the second cylinder so that when the differential pressure valve is enabled the accumulator reduces pressure spikes which would occur before the differential pressure valve would be able to react to the pressure differential between the two ports of the second cylinder.

2. The device of claim 1, wherein the device contains at least one valve operably connected to the differential pressure valve, the at least one valve adapted to disable the differential pressure valve to allow manual control of the cylinders.

3. The device of claim 2, wherein, when the at least one valve disables the differential pressure valve, the manual control is such that pistons in the cylinders move in a coordinated fashion.

4. The device of claim 3, wherein the first and a second cylinder each contain a piston such that the piston of the first cylinder is smaller than the piston of the second cylinder.

5. The device of claim 4, wherein the size of the barrel end of the first piston has approximately the same surface area of the rod end of the second piston not counting the second piston's rod.

6. The device of claim 3, wherein the at least one valve comprises a solenoid valve.

7. The device of claim 1, further comprising another accumulator attached to the other side of the cylinder.

8. The device of claim 1, wherein the differential pressure valve is adapted such that the differential pressure can be adjusted.

9. The device of claim 8, wherein the differential pressure valve is adjusted to maintain a differential pressure in the range 80–200 psi.

10. A method of maintaining a constant force supplied by a cylinder comprising:

supplying pressure to both sides of the cylinder through ports on both ends of the cylinder;

using a differential pressure valve hydraulically connected between both ends of the cylinder to switch between connecting and not connecting the two ports so that the valve attempts to maintain a constant pressure differential between the two ports;

reducing pressure spikes which would occur before the differential pressure valve could react to the pressure differential between the sides of the cylinder by using an accumulator hydraulically connected to one side of the cylinder;

supplying pressure to both sides of a second cylinder through ports on both ends of the second cylinder;

using a second differential pressure valve hydraulically connected between both ends of the second cylinder to switch between connecting and not connecting the two ports on the second cylinder so that the second differential pressure valve attempts to maintain a constant pressure differential between the two ports of the second cylinder; and reducing pressure spikes which would occur before the second differential pressure valve could react to the pressure differential between the sides of the second cylinder by using a second accumulator hydraulically connected to one side of the second cylinder.

11. The method of claim 10, further comprising disabling the differential pressure valves to allow manual control of the cylinders.

12. The method of claim 11, wherein the manual control further comprises moving pistons in the cylinders in a coordinated fashion.

13. The method of claim 10, wherein the pressure spike reducing step includes using another accumulator attached to the other side of the cylinder.

14. The method of claim 10, wherein the differential pressure valve using step includes adjusting the differential pressure valve to control the differential pressure.

15. The method of claim 14, wherein the differential pressure valve adjusting is adjusted to maintain a differential pressure in the range 80–200 psi.

16. A device for coordinating the movement of grabbers attached to two cylinders comprising:

a first and a second cylinder each containing a piston such that chambers are formed at the barrel and rod end of each piston, the first cylinder having a barrel port hydraulically connected to the barrel end chamber of the first cylinder, the second cylinder having a rod port hydraulically connected to the rod end chamber of the second cylinder, wherein the rod end chamber is such fluid in the rod end chamber contacts a back side of the barrel, the back side of the barrel being the side of the barrel that is connected to the rod, wherein the size of the barrel end of the first piston has approximately the same surface area of the back side of the barrel at the rod end of the second piston not counting the portion of the barrel contacting the second piston's rod wherein the piston in the first and second chamber are sized such that the piston of the first cylinder is smaller than the piston of the second cylinder;

a first differential pressure valve hydraulically connected between the barrel port and a rod port of the first cylinder, and a second differential pressure valve hydraulically connected between a barrel port and the rod port of the second cylinder; and at least one control valve, the at least one control valve adapted to switch between enabling the hydraulic connection between the barrel port of the first cylinder and the rod port of the second cylinder and enabling the first and second differential pressure valves.

17. The device of claim 16, wherein the at least one control valve is hydraulically connected to at least one connection valve, the at least one connecting valve being connected between the barrel port of the first chamber and the rod port of the second chamber and the at least one connecting valve can be closed so that the barrel port of the first chamber and the rod port of the second chamber can be isolated.

18. The device of claim 17, wherein at least one connecting valve comprises a ball valve.

19. The device of claim 17, wherein the at least control valve comprises a solenoid valve.

* * * * *